United States Patent
Broschard, III

[11] Patent Number: 5,653,610
[45] Date of Patent: Aug. 5, 1997

[54] SMART CARD CONNECTOR WITH CARD BIASING MEANS

[75] Inventor: John L. Broschard, III, Hershey, Pa.

[73] Assignee: The Whitaker Corporation, Wilmington, Del.

[21] Appl. No.: 348,019

[22] Filed: Dec. 1, 1994

[51] Int. Cl.⁶ .................................................. H01R 13/44
[52] U.S. Cl. ............................................. 439/630; 439/325
[58] Field of Search ..................................... 439/188, 489, 439/629–637, 325–330; 200/51.1

[56] References Cited

U.S. PATENT DOCUMENTS

| | | | |
|---|---|---|---|
| 4,393,283 | 7/1983 | Masuda | 439/188 |
| 4,795,354 | 1/1989 | Owen | 439/137 |
| 4,887,188 | 12/1989 | Yoshida et al. | 361/413 |
| 4,900,272 | 2/1990 | Lange et al. | 439/630 |
| 4,900,273 | 2/1990 | Pernet | 439/630 |
| 5,013,255 | 5/1991 | Juret et al. | 439/260 |
| 5,030,124 | 7/1991 | Lorentzon | 439/188 |
| 5,033,972 | 7/1991 | Komatsu et al. | 439/153 |
| 5,321,247 | 6/1994 | Mroczkowski et al. | 235/492 |
| 5,330,363 | 7/1994 | Gardner et al. | 439/188 |
| 5,334,034 | 8/1994 | Reichardt et al. | 439/188 |
| 5,334,827 | 8/1994 | Bleier et al. | 235/492 |
| 5,336,984 | 8/1994 | Mischenko et al. | 320/2 |
| 5,380,997 | 1/1995 | Hania et al. | 439/630 |

OTHER PUBLICATIONS

U.S. Patent Application Serial No. 08/348,015 Abstract and drawings only filed Dec. 1, 1994.
U.S. Patent Application Serial No. 08/348,025 Abstract and drawings only filed Dec. 1, 1994.

*Primary Examiner*—Hien Vu

[57] ABSTRACT

A smart card connector with a card slot (10) for receiving a smart card employs an end position switch comprising a single resilient contact (14) engaging a stationary post (16) to detect full insertion of a smart card. Self cleaning wiping mating contact is generated when the resilient contact (14) engages the stationary rigid post (16). The resilient contact (14) and the post (16) are mounted in the rear of a housing base (4) which includes resilient data contacts (12). The housing base (4) also includes resilient cantilever diverter springs (18), molded into the housing base which both protect the data contacts (12) and provide a reactive force to counter the force exerted by the normally closed resilient contact (14) upon full insertion of the smart card.

14 Claims, 8 Drawing Sheets

SMART CARD CONNECTOR WITH CARD BIASING MEANS

FIELD OF THE INVENTION

This invention relates to apparatus for use with smart cards, or chip cards, which contain memory or other intelligence on the card, and more specifically to devices, such as card readers, for interfacing with cards of this type. More specifically this invention relates to connectors for use with such smart cards, the connectors being a component of the smart card reader or other smart card interface device. Still more specifically this invention relates to smart card connectors including means for minimizing wear on data contacts and maintaining the card in its proper position.

BACKGROUND OF THE INVENTION

A smart card or chip card as presently used consist of a card of approximately the same size as a standard credit card that contains intelligence on the card itself. This intelligence is typically in the form of a memory circuit which can contain read only memory or read/write memory (random access memory) contained on the card. The information stored in the card's memory can then be used by the card reader or card interface device to detect certain information stored on the card, such as an instantaneous bank balance. The information stored in the card's memory can also be instantaneously updated, for example the alteration of the security status of a specific badge holder. Cards of this type can also be used with cable television decoders or descramblers and with satellite systems.

Although the preferred embodiments of this invention are specifically directed to smart cards, it is equally applicable to connectors or similar devices. For example this invention would be applicable to the use of connectors for smart keys and could even be used for memory cards of the type generally referred to as PCMCIA cards.

Among the problems which must be overcome for card connectors and card readers of this type to attain a satisfactory level of performance is that the connectors must function for a large number of card insertions, and the card connector must function in environments which can cause deterioration or damage to the contact interface of the data contacts and the end position switches. Typically the card connectors will be used in applications, such as in automatic teller machines or in security devices, where a large number of cards will be used with a single card connector or reader. Over time the cards used in these applications can become deformed and can collect foreign substances which can interfere with the operation of the card reader. The card connectors can also be used in environments, such as outdoor use in automatic teller machines, where they are susceptible to environment contaminants, or in which oxides could build up over time. Since these applications employ relatively low electrical potential and current, the energy present in power applications to burn off these contaminants or oxides is not available. Therefore it is desirable that a wiping contact between the data contacts and the card contact pads be established to insure removal of contamination from the contact area. This wiping contact, however, must not be accompanied with excessive force which might damage the plating on the data contacts or the resilient data contacts themselves. Similarly, a wiping contact action is desirable on the end position switch contacts for the same reasons.

U.S. Pat. No. 4,900,273, U.S. Pat. No. 5,013,255, and U.S. Pat. No. 5,334,034 each disclose smart card readers or connectors. None of these smart connectors appear to employ means for reducing wear on data contacts in the connector.

SUMMARY OF THE INVENTION

A smart card connector for use with a smart card containing electronic intelligence, such as memory, uses resilient data contacts to engage contact pads on the smart card. To prevent damage to the data contacts, the smart card connector includes diverters to bias the card away from the data contacts during insertion of the card into a card slot in the connector. The diverter does not prevent engagement between the smart card and the data contacts during insertion, but it does tend to limit the normal force exerted on the contacts. Thus wear on the contacts, which will generally be used for a large number of card insertions, will be reduced. The diverter also biases the card away from the ends of the data contacts to prevent the card from stubbing against the contact ends.

The diverters also maintain continuous engagement with the smart card. When an end position switch is used in the smart connector, the switch will tend to exert a force tending to push the card out of the card slot. The diverter will provide a frictional force on the smart card to resist the force of the end position switch and keep the card in its fully inserted position. The diverters will help keep the card in engagement with a card stop in the card slot so that the card stays in the proper position with the contacts on the card in engagement with corresponding data contacts.

In the preferred embodiment, each diverter comprises a cantilever beam molded as an integral part of the connector housing base. Therefore the diverter can be included in the housing base at minimal additional cost and without the necessity of additional assembly operations. The end of each diverter cantilever beam include a boss which extends into the card entry slot and the cantilever beam is deflected when the card engages the boss. The smart cards engage the bosses on the diverters before engaging the data contacts to bias the card away from the data contacts. The cantilever beam remains deflected when the card is fully inserted to maintain a force opposing the action of the end position spring.

DETAILED DESCRIPTION OF THE PREFERRED EMBODIMENTS

Figure 1:
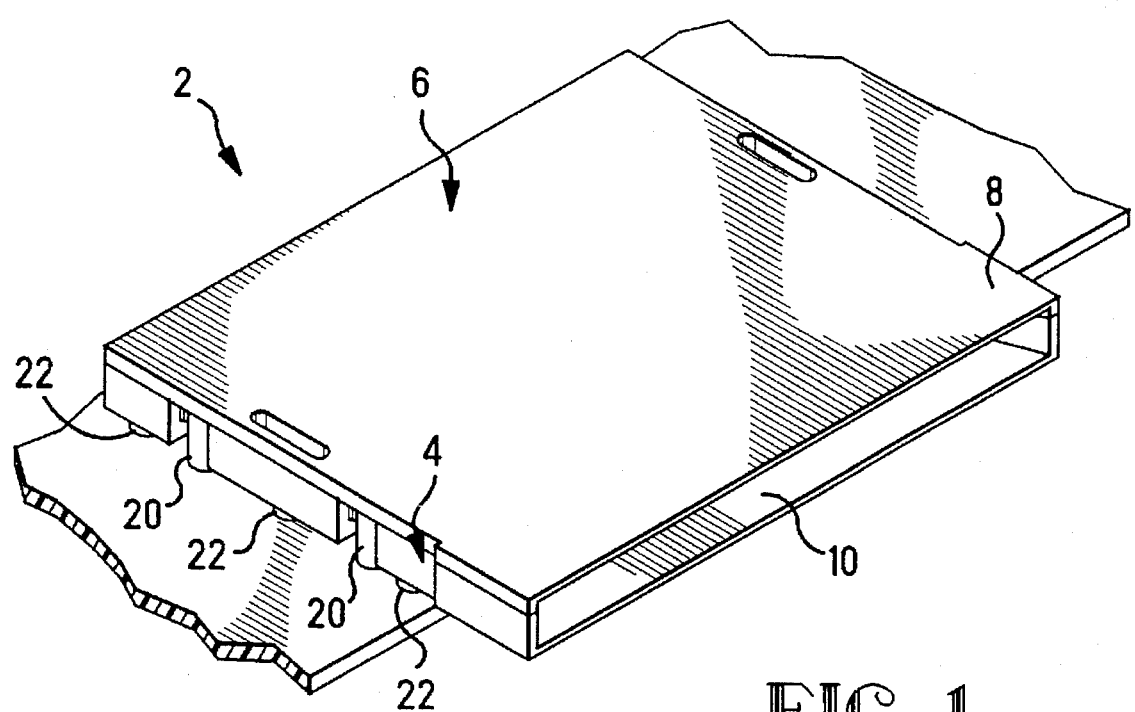
FIG. 1 is a perspective view of a representative embodiment of a smart card connector mounted on a printed circuit board.

The smart card connector 2 shown in FIG. 1 is intended to be mounted in a printed circuit board and to provide the interface in which a smart card can be inserted so that data can be read from or written into the smart card by the smart card interface circuitry. The embodiment shown in FIG. 1 includes a housing base 4 and housing cover 6, both of which have a scoop or card entry shroud 8 at the front of the housing. The base 4 and cover 6 form a card slot 10 which extends from the front of the housing through the shroud or scoop 8 to the rear of the smart card connector 2.

The housing base 4 and the housing cover 6 are each injection molded from a conventional thermoplastic material. In the preferred embodiment of this invention, these housing components are molded from a PCT plastic such as Ektar, a plastic supplied by Kodak.

FIG. 1 also shows mounting posts 20 extending from the bottom of the housing base 4 to secure the smart connector to a printed circuit board. FIG. 1 also shows standoffs 22 which position the smart connector above the printed circuit board to allow for proper installation and cleaning of the solder contacts on the printed circuit board.

Figure 2:
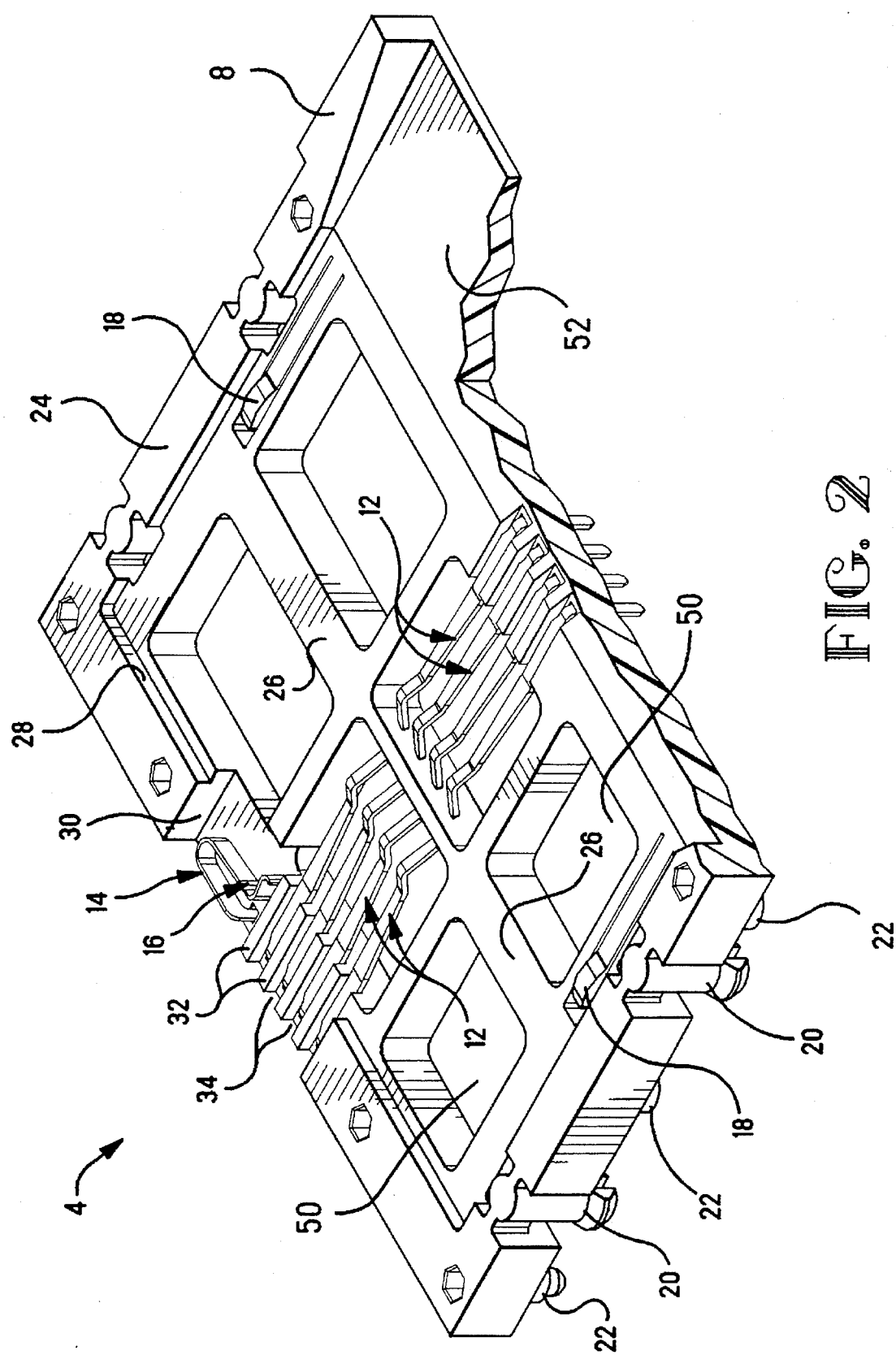
FIG. 2 is a perspective view of the smart connector housing base showing the position of data contacts, an end position switch and mounting posts for positioning the smart connector on a printed circuit board.

The housing base 4 is also shown in FIG. 2 where the upper surface of the housing base is shown. The upper surface of the housing base 4 comprises the bottom of the card slot 10. In the embodiment shown in FIG. 2, eight data contacts 12 are mounted in the housing base 4 in position to engage contact pads on a smart card inserted into the card slot 10. In this embodiment, four data contacts 12 extend from the front of the housing base 4 and four other offset data contacts 12 extend from the rear of the housing base 4. The data contacts are resilient and contact portions of the data contacts 12 extend above the upper surface of the housing base 4 where they will engage pads on a smart card. The smart connector 2 also includes a normally closed end position or end of stroke switch which is located at the rear of the card slot 10 and housing base 4. The end position switch is formed by a switch spring 14 and a switch post 16, both of which are anchored in the housing base 4. The switch spring 14 and the switch post 16 are positioned on one side of the four data contacts 12 which extend from the rear of the housing base 4. The housing base also includes two diverter springs 18 which are part of the molded housing base 4. The respective semi-cylindrical bosses on the diverter springs 18 are located slightly in front of the contact points of the front data contacts 12 and one diverter spring 18 is located on either side of the array of data contacts 12, as best seen in FIG. 2.

The housing base 4 has a peripheral rim 24 which extends around the two sides and partially along the rear of the upper surface of the housing base 4. The top of rim 24 is above the interior upper surface 26 and the gap formed between the top of the rim 24 and the surface 26 forms the lower half of the housing slot 10 in the assembled smart card connector 2. A shoulder 28 extends between peripheral rim 24 and surface 26 adjacent the two sides of the back of the housing base 4. This shoulder 28 serves as a card stop when a smart card is fully inserted into the housing slot 10. A channel 30, the lower surface of which is recessed below surface 26, is located between side portions of the rim 24 along the rear of the housing base 4. The four rear data contacts 12, the switch spring 14 and the switch post 16 are anchored to the housing base 4 in the channel 30. Separation ribs 32 extend up from the bottom of channel 30 to form contact slots 34 in which individual data contacts 12 are located. Six generally square openings 50 extend through the surface 26 from its top to the bottom. The four openings 50 located along the sides of the housing base 4, adjacent to the rim 24 are formed to eliminate unneeded plastic and are optional. The two center openings 50 provide clearance for deflection of the data contacts 12 to flex when a smart card is inserted into the slot 10. The mounting posts 20 and the standoffs 22 are molded as part of the rim 24 and each extends from the lower surface or rim 24. The lower half of the shroud or scoop 8 is partially shown at the front of the housing base 4 in FIG. 2. This shroud is shown broken away to expose the other elements of the housing base 4 and components mounted in the housing base. The inclined surface 52 on the shroud or scoop 8 provides a lead in for insertion of a smart card into the housing slot 10.

Figure 3:
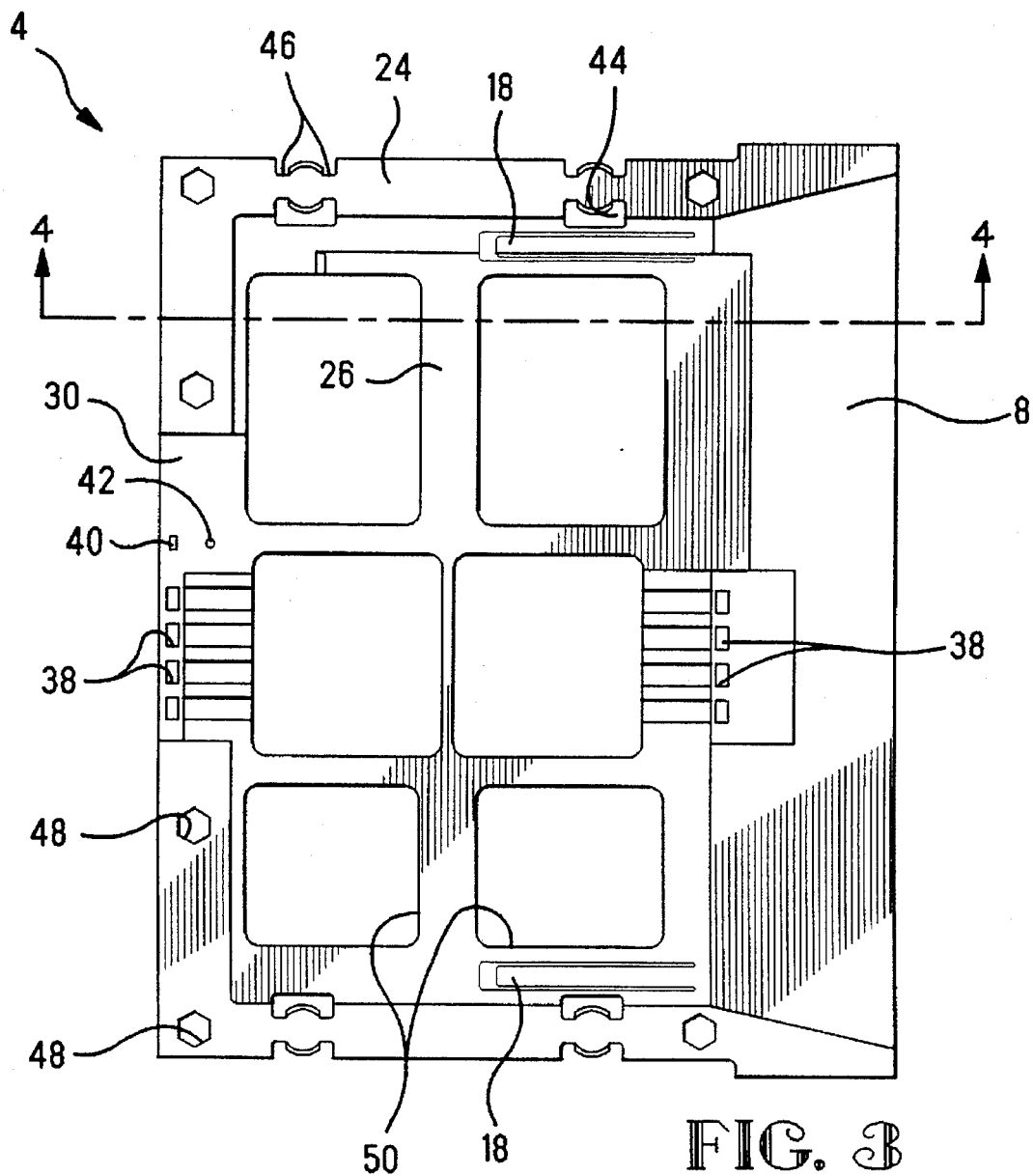
FIG. 3 is a top plan view of the smart connector housing base.
Figure 4:
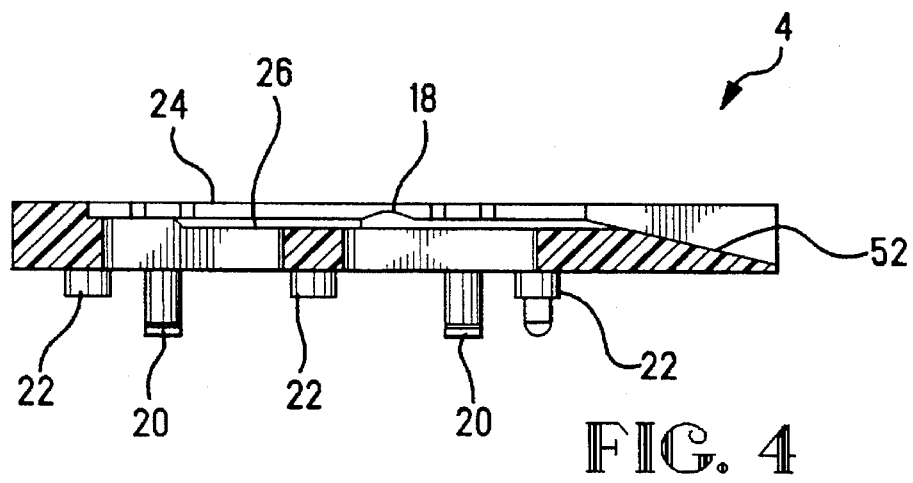
FIG. 4 is a side section view of the housing base taken along section line 4—4 in FIG. 3 of the smart connector base showing the front shroud or scoop and the mounting posts.

Other details of the housing base 4 are shown in the top plan view of FIG. 3 and the side sectional view of FIG. 4. As previously discussed, the data contacts 12, the switch spring 14 and the switch post 16 are mounted in the housing base 4. Data contacts mounting holes 38, in which data contacts are inserted, are located in the front of the housing base 4, behind the shroud 8 and in the channel 30 formed at the rear of the housing base 4. The switch mounting hole 40 is located in the channel 30 to the rear of the switch post mounting hole 42, both of which are located on the side of the mounting holes 38 for the data contacts 12. The mounting posts 20 and the standoff posts are shown extending from the lower surface of the housing base 4 along the outer edges. The housing base 4 is molded using a straight pull mold without side pulls. Clearance holes 44 and grooves 46 extend through the rim 24 on opposite sides of the mounting posts 20 so that latching and camming surfaces by be formed adjacent to the lower ends of the mounting posts. These structures will be subsequently discussed in more detail. Six cover mounting holes 48 are located in the rim 24 along the sides and rear of the housing base 4. These holes 48 will receive cover mounting lugs to secure the cover 6 to the base 4 as will be apparent during the subsequent discussion of the cover. Alternatively eight holes and lugs can be used to attach the cover.

Figure 5:
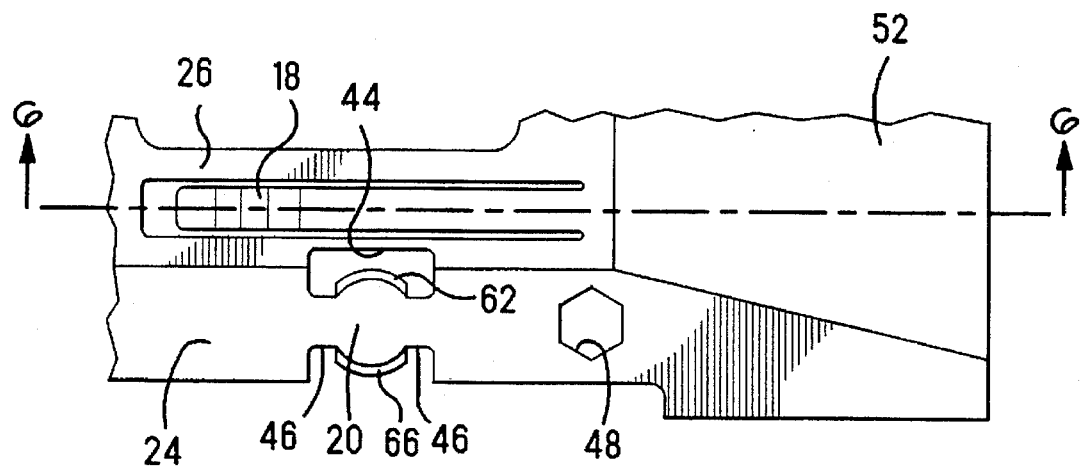
FIG. 5 is a fragmentary view of the housing base showing the position of the base diverter springs.
Figure 6:
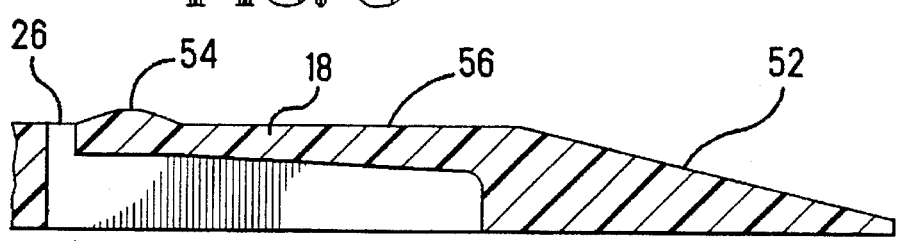
FIG. 6 is side section view of the housing base taken along section lines 6—6 in FIG. 5 showing the diverter springs.

FIGS. 5–8 are fragmentary views of different features on the housing base 4. FIG. 5 shows the portion of the plan view of the housing base 4 containing the diverter springs 18, the mounting posts 20 and the cover mounting holes 48. Each diverter spring 18 comprises a molded cantilever beam which is integral with the base 4. Two gaps on either side of the diverter spring 18 join a transverse gap at the distal end of the spring to define the diverter spring. This cantilever beam is formed during molding of the base by blades or walls which form the gaps. As can best be seen in the side sectional view of FIG. 6 each diverter spring 18 has a raised semi cylindrical boss 54 adjacent its free end and spaced from the base portion 56 of the cantilever diverter spring 18. This boss 54 normally extends above the upper surface 26 of the housing base 4 in the card slot area 10. When a card is inserted into the card slot 10, the card engages the boss 54 and the diverter 18 is forced downward while the card is urged upward toward the top of the slot 10. This action serves several purposes. First it tends to provide a controlled lead in for the card slot and prevents the card from snagging on any irregular surface on the housing base. Second by urging the card upward, less force is exerted against the resilient data contacts 12, especially during relative movement between the card and the data contacts 12, thus tending to prolong the life of the data contacts 12. Engagement of the diverter spring 18 with the card also produces a frictional force which tends to prevent movement of the card back out of the slot and tends to resist the force exerted by the end position spring 14.

Figure 7:
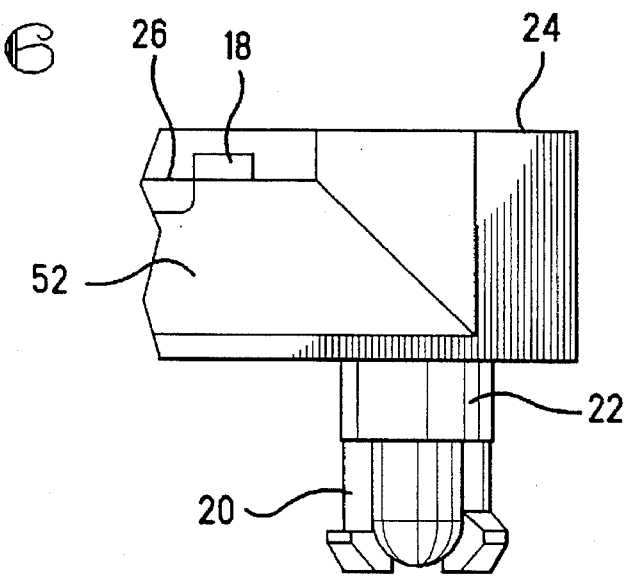
FIG. 7 is a fragmentary side view of the housing base showing the mounting posts.
Figure 8:
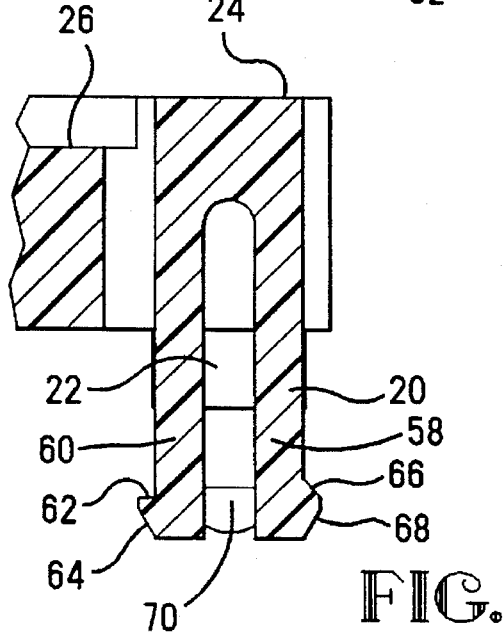
FIG. 8 is a side sectional view of the housing base showing the mounting posts.

FIG. 5 also shows the configuration of the clearances 44 and 46 and upwardly facing surfaces 62 and 66 on the mounting posts 20 which are formed by molding pins extending through these clearance openings. FIGS. 7 and 8 show more detail of the mounting posts 20. Each mounting posts comprises two separate legs extending form the lower surface of the housing base 4. These two legs are formed by a slot 70 extending between the lower surface of the base 4 and the free ends of the mounting posts 20. Each of the mounting post legs is flexible. A mounting post latching leg 60 is located on the interior side of slot 70 while a mounting post cinching leg 58 is located adjacent the exterior side of the housing base 4. As can be best seen in FIG. 8, each of the legs has an enlarged section adjacent its distal end. The latching mounting post leg 60 has a downwardly facing beveled or inclined surface 64 and an upwardly facing latching surface 62 which extends perpendicular to the axis of the mounting post leg 60. When the housing base 4 is inserted downwardly into a mounting hole in a printed circuit board, the beveled surface 64 causes leg 60 to resiliently cam inwardly to permit entry of the leg 60 into the mounting hole. Once fully inserted, the latching surface 62 will engage the lower surface of the printed circuit board to prevent upward extraction of the housing base 4 and the smart card connector 2. Only an intentionally applied lateral force on mounting post leg 60 will disengage the latching surface 62 from the printed circuit board. The other mounting leg 58 also has a downwardly facing beveled surface 68 which again cams this leg inwardly to permit insertion of the mounting post 20 into a mounting hole. However, cinching leg 58 has an upwardly facing beveled surface 66. This upwardly facing beveled or inclined surface 66 does not latch against the bottom of a printed circuit board in the same manner as latching surface 62. Instead this beveled surface engages the printed circuit board along the edge of the post mounting hole and pulls the housing base 4, and the smart connector 20 towards the printed circuit board on which it is mounted if the thickness of the printed circuit board is less than its nominal dimension. The connector 2 will then fit snugly against the printed circuit board helping to insure that the smart connector is properly portioned on the printed circuit board. Alternatively, the upwardly facing beveled surface 66 will provide a greater range of engagement with printed circuit boards having a thickness greater than its nominal dimension. For these thicker printed circuit boards, the latching surface 62 on mounting post leg 60 may not fully deploy because it remains within the confines of the printed circuit board hole. This is of course true for conventional mounting posts which employ only a perpendicular latching surface. The upwardly facing beveled surface 66 will however partially engage the lower surface or the printed circuit board, or at least the edge of the printed circuit board, to provide some latching engagement. This beveled surface will help take up any tolerances in the printed circuit board and the housing base 4 to insure a tight rather than a lose fit. Latching is still maintained by the perpendicular surface 62 on the other leg 60 on most printed circuit boards.

Figure 9:
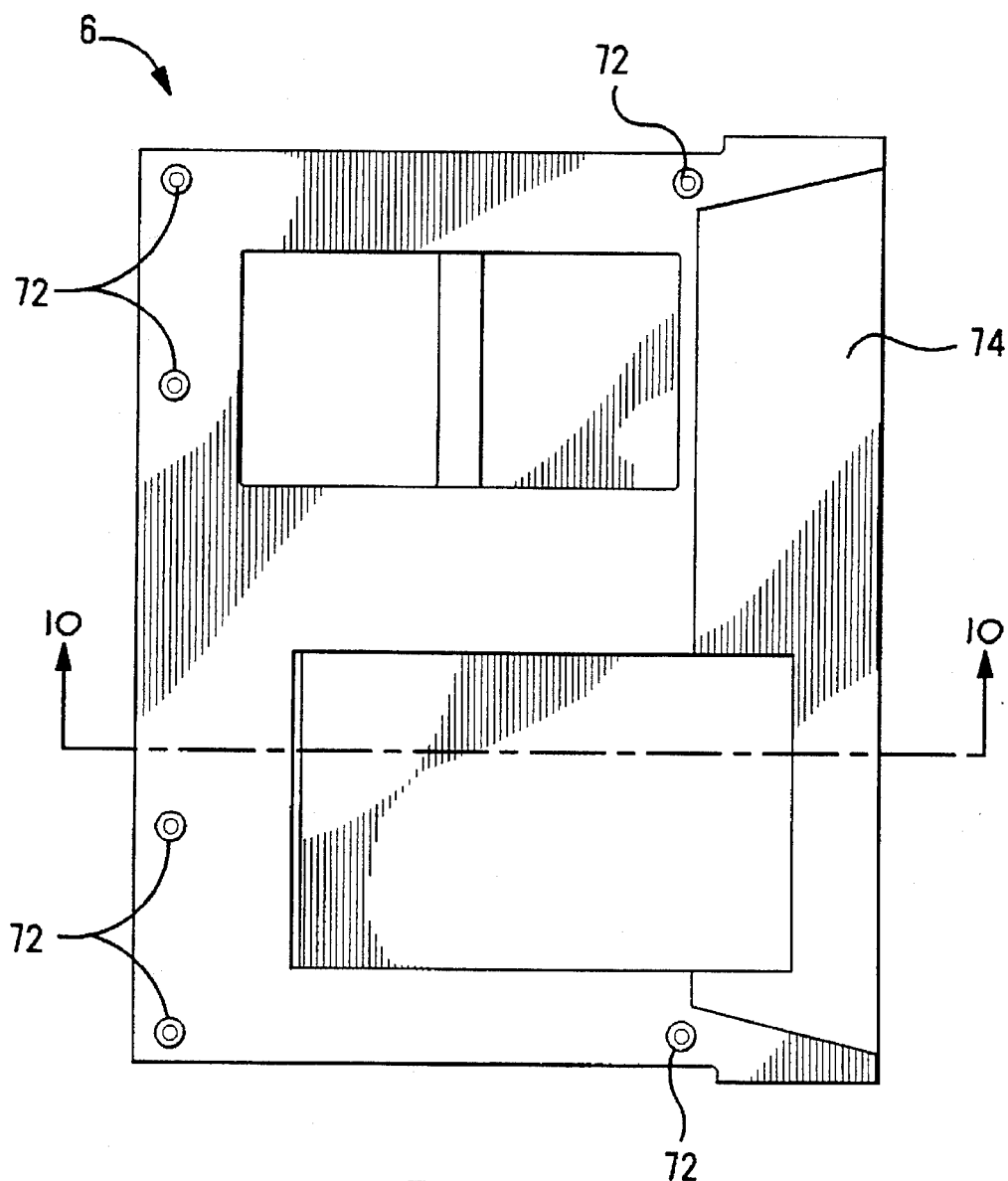
FIG. 9 is a view of the bottom of the housing cover.
Figure 10:
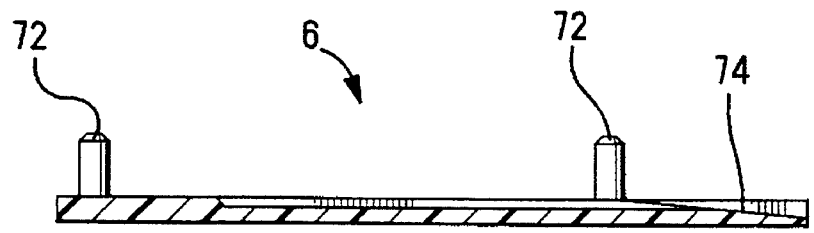
FIG. 10 is a section view of the housing cover taken along section line 10—10 in FIG. 9.
Figure 11:
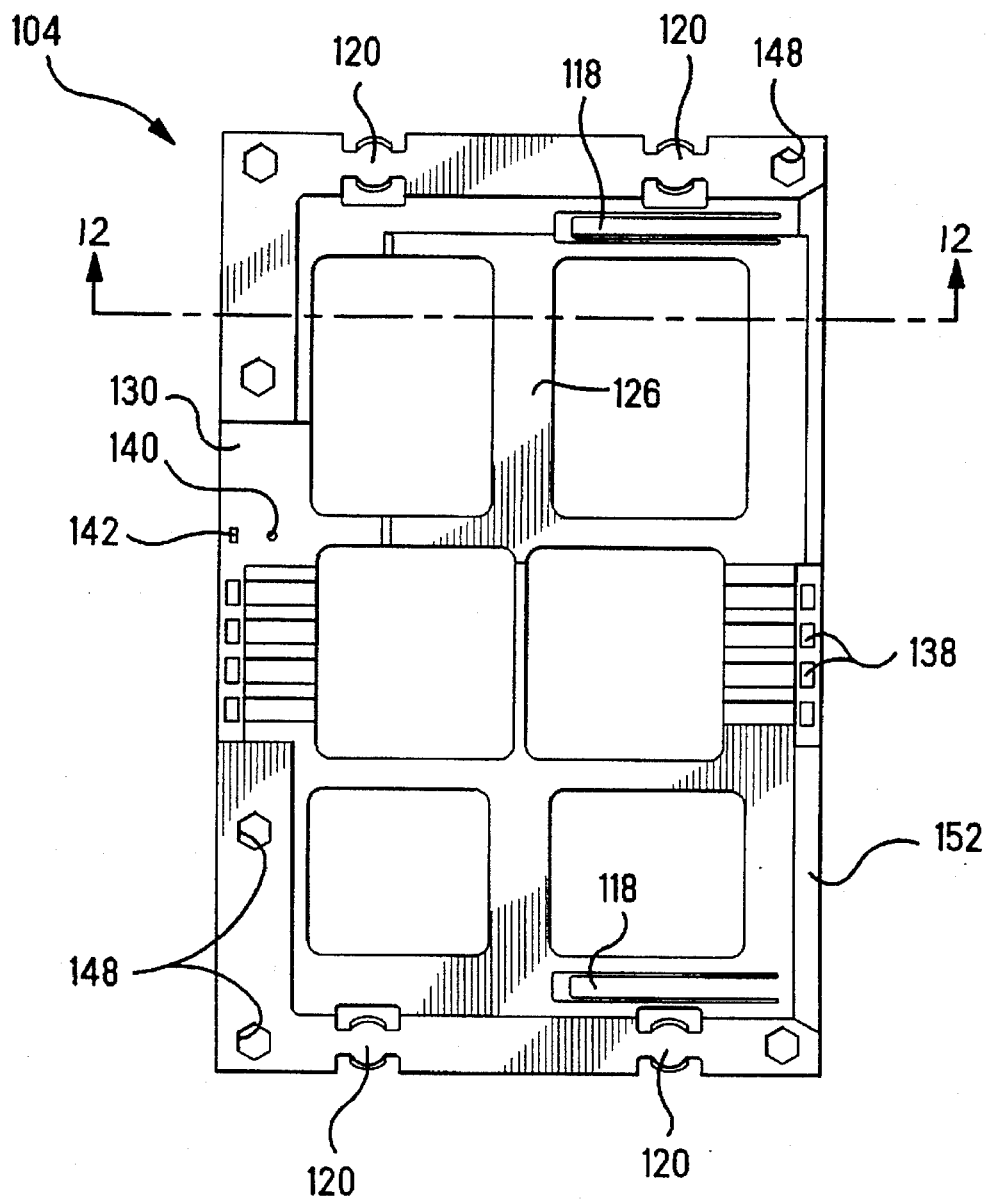
FIG. 11 is a top plan view of a second embodiment of a smart connector housing base which does not include a front shroud.
Figure 12:
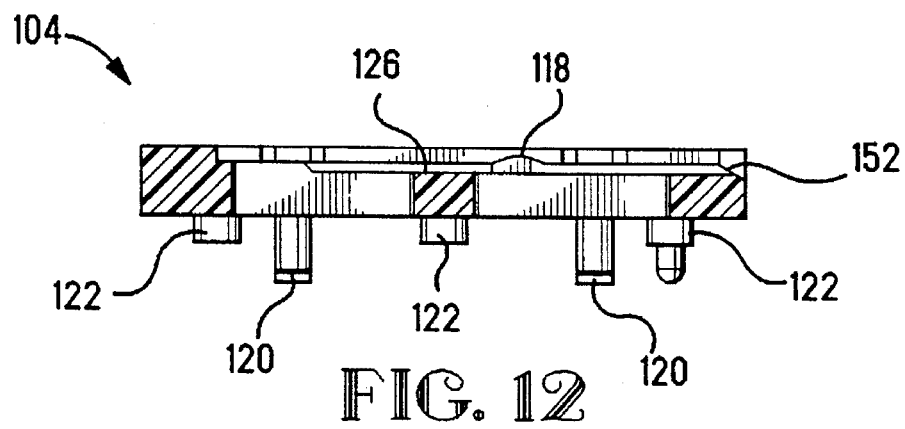
FIG. 12 is a side sectional view of the housing base shown in FIG. 11.
Figure 13:
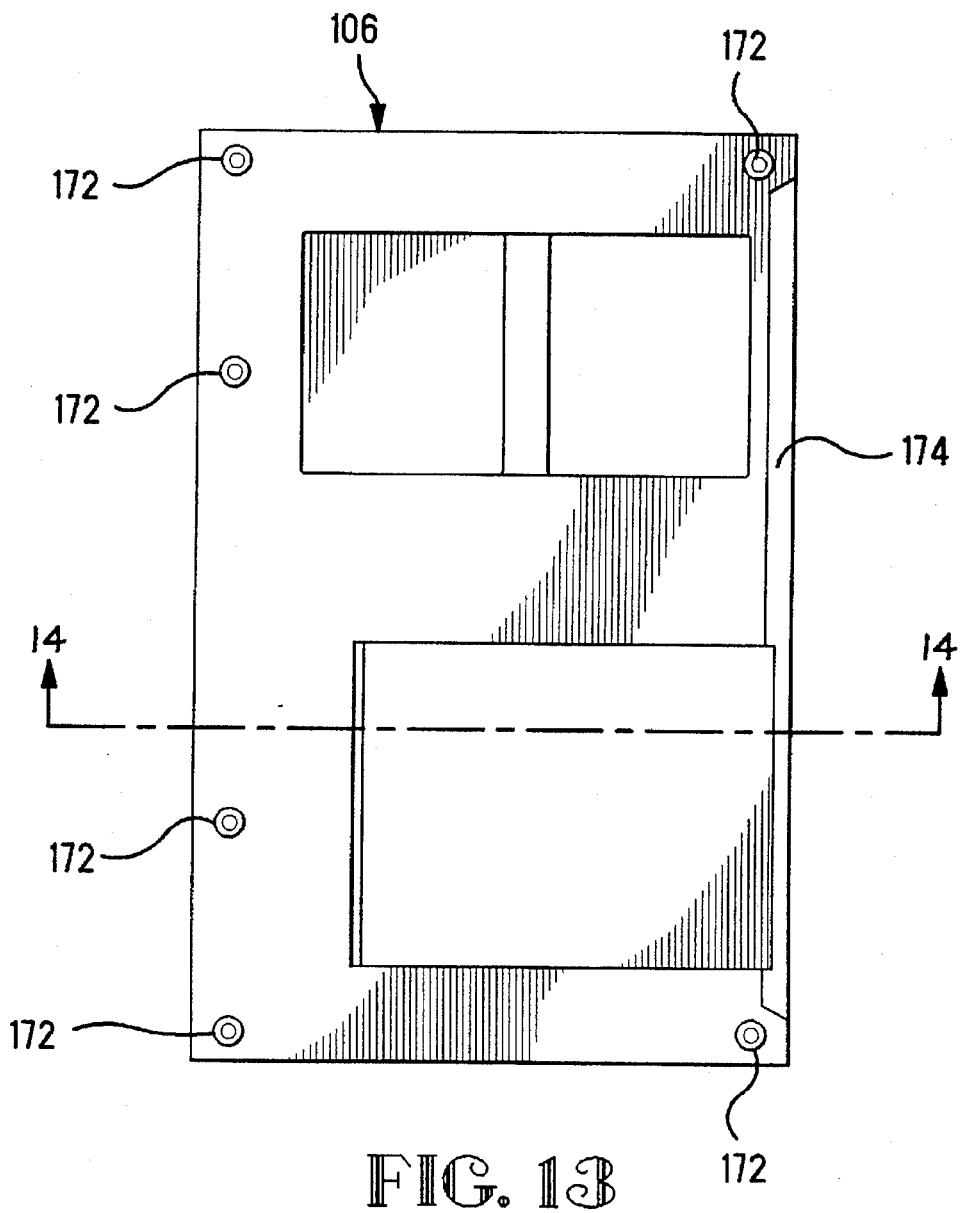
FIG. 13 is a bottom view of a housing cover which is used with the embodiment of the housing base shown in FIGS. 11 and 12.
Figure 14:
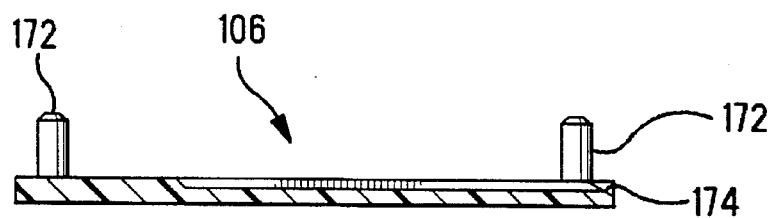
FIG. 14 is a side sectional view of the housing cover shown in FIG. 13.

The housing of this embodiment of the smart connector is a two piece member consisting of the housing base 4 and a housing cover 6 which is attached to the base. The cover 6 is shown in FIGS. 9 and 10. Cover 6 is a substantially flat molded member formed of the same material as the base 4. A downwardly facing inclined surface 74 is located on the front of the cover 6 and together with opposed inclined surface 52 on the base 4, forms the inclined entry scoop or shroud 8. The cover also has six downwardly extending lugs 72 molded into the bottom surface of the cover 6. These lugs 72 are positioned for insertion into lug mounting holes 48 on the housing base 4. The cover 6 can the be attached simply by inserting the lugs 72 into holes 48. Any number of conventional techniques can be used to secure the lugs 72 in holes 48. The lugs and holes can be dimensioned for an interference or press fit. Alternatively the lugs 72 can be ultrasonically bonded in the holes 48 or they can be heat staked. The lugs can also be provided with latching surfaces to secure the cover 6 to the base 4. Alternatively the cover 6 could be secured to the base by using latches which engage the opposite member around the periphery.

FIGS. 11–14 show alternate embodiments of a housing base 104 and cover 106 which does not include a lead in shroud or scoop. This alternate embodiment is otherwise the same as the embodiment of FIGS. 1–10. Similar reference numbers have been used to identify corresponding components in both embodiments, with the components of the second embodiment being identified by a 100 series of numerals. For example the mounting posts are referred to using the numeral 120 in the second embodiment, and the second embodiment diverter springs are referred to by the numeral 118. This unshrouded embodiment could be used in applications in which the lead in is not necessary. For example, this embodiment could be mounted on a chassis which included a lead in as part of the chassis. A third embodiment, similar to the second embodiment would include a separate attachable shroud which could be mounted at the front of the housing base 104 and cover 106 so that the same base and cover components could be used in either a shrouded or an unshrouded configuration.

Figure 15:
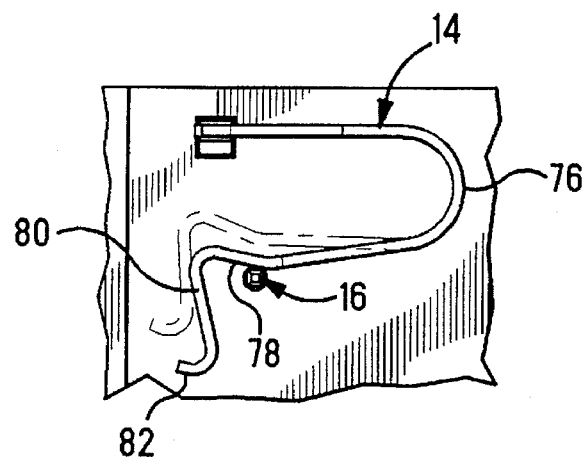
FIG. 15 is a top plan view of the spring and post which form the end position switch showing the normally closed position of the switch, with the deflected or open position of the switch spring shown in phantom.

The data contacts 12, the switch spring 14 and the switch post 16 can be used with any of the embodiments of the housing base and cover. FIG. 15 shows a top plan view of the switch spring 14 and the switch post 16 which together form the normally closed end position switch used in this smart connector. The switch spring 14 comprises a stamped and formed member which is fabricated from a conventional spring metal. The spring is formed in a U-shaped configuration formed by two arms and a connecting bight which together form the deflectable spring section 76. The forward portion of this deflectable spring section joins a wiping contact section 78 which is formed toward the rear portion of the spring about an angle of approximately one hundred sixty degrees. This contact or wiping section 78 joins a forward extension 80 which is formed at an angle of approximately sixty five degrees. This forward extension 80 extends into the card slot 10 when mounted on the housing base 4. A card engaging tab 82 is formed on the end of the forward extension 80 to provide a card engagement surface. When positioned in the housing base 4, the tab would normally be in the card slot 10.

The post 16 can be any of a number of simple contact pins. In the preferred embodiment, this post 16 is in the form of a brass wire, having a outer diameter of approximately 0.0169 inch, which can be plated with a noble metal in the contact area and can have a tin lead plating at the end to be soldered in a printed circuit board. A interference retention area can be stamped in this post to provide an interference fit of the wire post 16 in the post mounting hole 42 in the channel 30 of the housing base 4. Alternatively this post could be formed using a conventional square post configuration.

The engagement between the post 16 and the spring 14 can best be seen in FIG. 15. In the normally closed position the post 16 engages the spring approximately in the middle of the wiping contact section 78. When a card engages the tab 82, the spring 16 can be deflected rearwardly to approximately the position represented by the phantom lines in FIG. 15. In this open position the spring 16 is no longer in engagement with the post 16. Total travel between the closed and the open positions can be on the order of 0.030 inch. Opening the switch would be interpreted by the smart card reader as indicating that a card had been inserted into card slot 10 into engagement with the rear card stop shoulder 28. At this point the diverter springs 18 would engage the lower surface of the card and would provide a reactive force against the restoring force of the spring 14. When the card is removed the spring 14 will return to its normally closed position. Since the wiping contact section 78 is angled relative to the spring section 76 and engages the post 16 in an inclined tangential direction, there is a wiping action between the spring 14 and the post 16 tending to remove contaminates from the mating surfaces and insure reliability of the contact. The U-shaped spring is the only resilient member and this spring occupies less space than the conventional dual resilient members normally used in end position switches.

Figure 16:
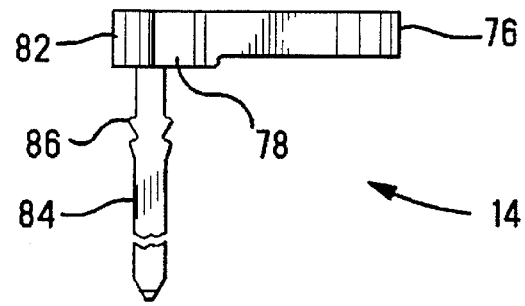
FIG. 16 is a side view of the switch spring shown in FIG. 15.

FIG. 16 shows the mounting leg 84 located on the spring at the end of the deflectable section 76 opposite from the wiping contact section. This mounting leg extends generally perpendicular to the other spring sections and includes anchoring barbs 86. When the mounting leg 84 is inserted into spring mounting hole 40 in the housing base 4, these anchoring barbs engage the housing base to secure one end of the spring in the base. The distal end of the leg 84, which includes a tin lead plating, forms a solder tail which extends below the bottom surface of housing base 4 where it can be soldered into a plated through hole in a printed circuit board.

Figures 17, 18:
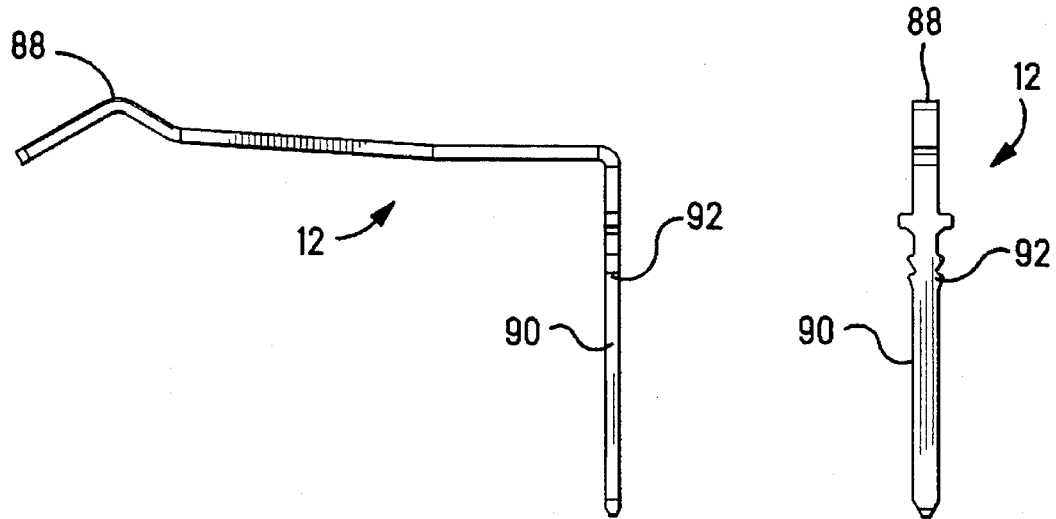
FIG. 17 is a side view of a data contact used in the smart connector.
FIG. 18 is a view of a data contact showing the anchoring leg of the data contact.

FIGS. 17 and 18 show the data contacts 12. These contacts are substantially conventional resilient contacts which include a contact arm 88 with a contact point located adjacent its distal end. The opposite end of the data contact 12 is bent at a right angle to form an anchoring leg and solder tail section 90. Anchoring barbs 92 are formed adjacent the right angle bend so that the data contacts 12 can be press fit into the contact mounting holes 38 at the front and the rear of the housing base 4.

Although only a single representative embodiment of this invention is depicted herein, other structures incorporating this embodiment would also be apparent to one of ordinary skill in the art. For example, the diverters of this embodiment comprise molded cantilever beams. The diverters could be joined to the housing base at both ends instead of as cantilever beams. The diverters could also be separate members instead of being integrally molded. A spring biased diverter could also be locate directly in front of the data contacts instead of on the side as in the preferred embodiment of this invention. Therefore the following claims should not be interpreted as being limited to this sole embodiment.

I claim:

1. A connector for use with a smart card, the connector comprising:

an insulative housing comprising a base and a cover, the base and the cover defining a card slot between the base and the cover, the card slot being open at an entrance at a front of the housing and extending toward a rear of the housing, with the housing base and the cover having a shroud formed by converging inclined surfaces thereon at the car slot entrance;

data contacts extending into the slot, full insertion of the smart card into the card slot resulting in engagement of the data contacts with the smart card; and a pair of cantilever beams integrally molded from the housing base extending along the card slot and including projecting portions adjacent distal ends thereof protruding into the card slot along both sides of the data contacts, and between the data contacts and the entrance to the card slot so that a card inserted into the card slot is diverted away from the data contacts during card insertion to reduce wear on the data contacts.

2. The connector of claim 1 wherein each cantilever beam includes bosses adjacent the cantilever beam distal end, only the bosses protruding into the card slot.

3. The connector of claim 1 wherein each cantilever beam joins the housing base adjacent the front of the card slot with the bosses located at the rear of the cantilever beams.

4. The connector of claim 1 wherein the card entry shroud comprises converging inclined surfaces on the housing base and the cover.

5. The connector of claim 1 wherein the housing base includes openings communicating with the card slot to provide clearance for the deflection of data contacts, the openings being located between said cantilever beams.

6. A connector for use with a smart card, the connector comprising:

an insulative housing comprising a base and a cover, the base and the cover defining a card slot between the base and the cover, the card slot being open at an entrance at a front of the housing and extending toward the rear of the housing, with the housing base and the cover having a shroud formed by converging inclined surfaces thereon at the card slot entrance;

data contacts extending into the slot, full insertion of the smart card into the card slot resulting in engagement of the data contacts with the smart card;

a switch located at the rear of the card slot, the switch being activated when a smart card, fully inserted into the card slot engages the switch; and a pair of cantilever beams integrally molded from said housing base and including projecting portions adjacent distal ends thereof extending into the card slot along both sides of the data contacts proximate the card slot entrance to bias the smart card away from the data contacts during initial stages of insertion of the smart card into the card slot.

7. The connector of claim 6 wherein the switch comprises a deflectable spring, the deflectable spring being positioned for engagement with a smart card fully inserted into the card slot, the cantilever beams exerting a force on the smart card to resist a restoring force exerted by the deflectable spring.

8. The connector of claim 7 wherein the switch includes both a spring and a stationary post, both the spring and the post being mounted in the base, so that the connector can be mounted on a printed circuit board with the switch and post connected to a circuit for determining when a card is present in the connector.

9. The connector of claim 6 wherein the housing base includes a card stop at the rear of the card slot, each cantilever beam being positioned in front of the card stop.

10. A connector for use with a smart card, the connector comprising:

an insulative housing comprising a base and a cover, the base and the cover defining a card slot between the base and the cover, the card slot being open at an entrance at a front of the housing and extending toward the rear of the housing, with the housing base and the cover having a shroud formed by converging inclined surfaces thereon at the card slot entrance;

data contacts extending into the card slot, full insertion of the smart card into the card slot resulting in engagement of the data contacts with the smart card;

a pair of cantilever beams having projecting portions at distal ends thereof protruding into the card slot between the data contacts and the entrance to the card slot so that a card inserted into the card slot is biased upwardly in the card slot prior to engaging the data contacts, each of said cantilever beams being molded integrally with the housing base adjacent opposite sides of the card slot with said data contacts therebetween, with the housing base having gaps extending therethrough along both sides and the distal end of of each of said cantilever beams.

11. The connector of claim 10 wherein the lower surface of the card slot is defined by a recessed surface into the top of the housing base.

12. The connector of claim 11 wherein openings extend through said recessed surface into the housing base to provide clearance for deflection of the data contacts.

13. The connector of claim 12 wherein the housing base includes a channel at the rear of the housing base, the channel communicating with the card slot, at least some of the data contacts extending from the channel into the card slot.

14. The connector of claim 13 wherein mounting posts extend from a lower surface at a periphery of the housing base for mounting the connector to a printed circuit board.

* * * * *